US006999521B1

(12) United States Patent
Azadet et al.

(10) Patent No.: US 6,999,521 B1
(45) Date of Patent: Feb. 14, 2006

(54) METHOD AND APPARATUS FOR SHORTENING THE CRITICAL PATH OF REDUCED COMPLEXITY SEQUENCE ESTIMATION TECHNIQUES

(75) Inventors: Kameran Azadet, Middletown, NJ (US); Erich Franz Haratsch, Bradley Beach, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/471,920

(22) Filed: Dec. 23, 1999

(51) Int. Cl.
    *H04L 5/12* (2006.01)

(52) U.S. Cl. ............... 375/262; 375/341; 714/795; 714/796

(58) Field of Classification Search ............ 375/341, 375/262, 265; 714/794, 795, 796
See application file for complete search history.

(56) References Cited

U.S. PATENT DOCUMENTS

| | | | |
|---|---|---|---|
| 5,136,593 A | | 8/1992 | Moon et al. |
| 5,220,570 A | | 6/1993 | Lou et al. |
| 5,844,946 A | * | 12/1998 | Nagayasu ............ 375/341 |
| 5,870,433 A | | 2/1999 | Huber et al. |
| 5,881,106 A | * | 3/1999 | Cartier ............... 375/262 |
| 5,910,968 A | | 6/1999 | Chouly et al. |
| 5,931,966 A | | 8/1999 | Carley |
| 5,970,104 A | * | 10/1999 | Zhong et al. ......... 375/341 |
| 6,035,006 A | | 3/2000 | Matui |
| 6,088,404 A | * | 7/2000 | Jekal ................ 375/341 |
| 6,201,831 B1 | | 3/2001 | Agazzi et al. |

OTHER PUBLICATIONS

Fettweis et al., "High-Speed Parallel Viterbi Decoding: Algorithm and VLSI-Architecture," IEEE Communications Magazine, May 1991.
Chevillat et al., "Decoding of Trellis-Encoded Signals in the Presence of Intersymbol Interference and Noise," IEEE Transactions on Communications, vol. 37, No. 7, Jul. 1989.
Erich F. Haratsch, "High-Speed VLSI Implementation of Reduced Complexity Sequence Estimation Algorithms with Application to Gigabit Ethernet 1000Base-T," Bell Laboratories, Lucent Technologies, Holmdel, NJ, USA.
K. Azadet, "Gigabit Ethernet over Unshielded Twisted Pair Cables," Bell Laboratories, Lucent Technologies, Holmdel, NJ, USA.
Black et al., "A 140-Mb/s, 32-State, Radix-4 Viterbi Decoder," IEEE Journal of Solid-State Circuits, vol. 27, No. 12, Dec. 1992.

(Continued)

*Primary Examiner*—Phuong Phu

(57) ABSTRACT

A method and apparatus are disclosed for improving the processing time of reduced complexity sequence estimation techniques, such as reduced state sequence estimation. Precomputing the branch metrics for all possible symbol combinations in the channel memory makes it possible to remove the branch metrics unit and decision-feedback unit from the feedback loop, thereby reducing the critical path. A set of multiplexers select the appropriate branch metrics based on the survivor symbols in the corresponding survivor path cells. The computational load of the precomputations is reduced for multi-dimensional trellis codes by precomputing each dimension of the multi-dimensional trellis code separately. A hybrid survivor memory architecture is also disclosed for a RSSE for a channel having a channel memory of length L, where the survivors corresponding to the L past decoding cycles are stored in a register exchange architecture (REA), and survivors corresponding to later decoding cycles are stored in a trace-back architecture (TBA) or REA.

35 Claims, 6 Drawing Sheets

OTHER PUBLICATIONS

Cypher et al. "Generalized Trace-Back Techniques for Survivor Memory Management in the Viterbi Algorithm*," Journal of VLSI Signal Processing, 5, 85-94(1993).

Keshab K. Parhi, "Pipelining in Algorithms with Quantizer Loops," IEEE Transactions on Circuits and Systems, vol. 38. No. 7, 745-754 (Jul. 1991).

Bednarz et al., "Design, Performance, and Extensions of the RAM-DFE Architecture," IEEE Transactions on Magnetics, vol. 31, No. 2, 1196-1201 (Mar. 1995).

Rizos et al., "Reduced-Complexity Sequence Detection Approaches for PR-Shaped, Coded Linear Modulations," IEEE Global Telecommunications Conference, vol. 1, 342-346 (Nov. 1997).

* cited by examiner

800

METHOD AND APPARATUS FOR SHORTENING THE CRITICAL PATH OF REDUCED COMPLEXITY SEQUENCE ESTIMATION TECHNIQUES

FIELD OF THE INVENTION

The present invention relates generally to channel equalization and decoding techniques, and more particularly, to sequence estimation techniques with shorter critical paths.

BACKGROUND OF THE INVENTION

The transmission rates for local area networks (LANs) that use twisted pair conductors have progressively increased from 10 Megabits-per-second (Mbps) to 1 Gigabit-per-second (Gbps). The Gigabit Ethernet 1000 Base-T standard, for example, operates at a clock rate of 125 MHz and uses category 5 cabling with four copper pairs to transmit 1 Gbps. Trellis-coded modulation (TCM) is employed by the transmitter, in a known manner, to achieve coding gain. The signals arriving at the receiver are typically corrupted by intersymbol interference (ISI), crosstalk, echo, and noise. A major challenge for 1000 Base-T receivers is to jointly equalize the channel and decode the corrupted trellis-coded signals at the demanded clock rate of 125 MHz, as the algorithms for joint equalization and decoding incorporate non-linear feedback loops that cannot be pipelined.

Data detection is often performed using maximum likelihood sequence estimation (MLSE), to produce the output symbols or bits. A maximum likelihood sequence estimator considers all possible sequences and determines which sequence was actually transmitted, in a known manner. The maximum likelihood sequence estimator is the optimum decoder and applies the well-known Viterbi algorithm to perform joint equalization and decoding. For a more detailed discussion of a Viterbi implementation of a maximum likelihood sequence estimator, see Gerhard Fettweis and Heinrich Meyr, "High-Speed Parallel Viterbi Decoding Algorithm and VLSI-Architecture," IEEE Communication Magazine (May 1991), incorporated by reference herein.

In order to reduce the hardware complexity for the maximum likelihood sequence estimator that applies the Viterbi algorithm, a number of sub-optimal approaches, such as "reduced state sequence estimation (RSSE)" algorithms, have been proposed or suggested. For a discussion of reduced state sequence estimation techniques, as well as the special cases of decision-feedback sequence estimation (DFSE) and parallel decision-feedback equalization (PDFE) techniques, see, for example, P. R. Chevillat and E. Eleftheriou, "Decoding of Trellis-Encoded Signals in the Presence of Intersymbol Interference and Noise", IEEE Trans. Commun., vol. 37, 669–76, (July 1989), M. V. Eyuboglu and S. U. H. Qureshi, "Reduced-State Sequence Estimation For Coded Modulation On Intersymbol Interference Channels", IEEE JSAC, vol. 7, 989–95 (August 1989), or A. Duel-Hallen and C. Heegard, "Delayed decision-feedback sequence estimation," IEEE Trans. Commun., vol. 37, pp. 428–436, May 1989, each incorporated by reference herein. For a discussion of the M algorithm, see, for example, E. F. Haratsch, "High-Speed VLSI Implementation of Reduced Complexity Sequence Estimation Algorithms With Application to Gigabit Ethernet 1000 Base-T," Int'l Symposium on VLSI Technology, Systems, and Applications, Taipei (June 1999), incorporated by reference herein.

Generally, reduced state sequence estimation techniques reduce the complexity of the maximum likelihood sequence estimators by merging several states. The reduced state sequence estimation technique incorporates non-linear feedback loops that cannot be pipelined. The critical path associated with these feedback loops is the limiting factor for high-speed implementations.

U.S. patent application Ser. No. 09/326,785, filed Jun. 4, 1999 and entitled "Method and Apparatus for Reducing the Computational Complexity and Relaxing the Critical Path of Reduced State Sequence Estimation Techniques," incorporated by reference herein, discloses a reduced state sequence estimation algorithm that reduces the hardware complexity of reduced state sequence estimation techniques for a given number of states and also relaxes the critical path problem. While the disclosed reduced state sequence estimation algorithm exhibits significantly improved processing time, additional processing gains are needed for many high-speed applications. A need therefore exists for a reduced state sequence estimation algorithm with improved processing time. Yet another need exists for a reduced state sequence estimation algorithm that is better suited for a high-speed implementation using very large scale integration (VLSI) techniques.

SUMMARY OF THE INVENTION

Generally, a method and apparatus are disclosed for improving the processing time of the reduced complexity sequence estimation techniques, such as the reduced state sequence estimation technique, for a given number of states. According to one feature of the invention, the possible values for the branch metrics in the reduced state sequence estimation technique are precomputed in a look-ahead fashion to permit pipelining and the shortening of the critical path. Thus, the present invention provides a delay that is similar to a traditional optimum Viterbi decoder. Precomputing the branch metrics for all possible symbol combinations in the channel memory in accordance with the present invention makes it possible to remove the branch metrics unit (BMU) and decision-feedback unit (DFU) from the feedback loop, thereby reducing the critical path. In the illustrative implementation, the functions of the branch metrics unit and decision-feedback unit are performed by a look-ahead branch metrics unit (LABMU) and an intersymbol interference canceller (ISIC) that are removed from the critical path.

A reduced state sequence estimator is disclosed that provides a look-ahead branch metrics unit to precompute the branch metrics for all possible values for the channel memory. At the beginning of each decoding cycle, a set of multiplexers (MUXs) select the appropriate branch metrics based on the survivor symbols in the corresponding survivor path cells (SPCs), which are then sent to an add-compare-select unit (ACSU). The critical path now comprises one multiplexer, add-compare-select unit and survivor path cell. The disclosed reduced state sequence estimator can be utilized for both one-dimensional and multi-dimensional trellis codes.

For multi-dimensional trellis codes where the precomputation of multi-dimensional branch metrics becomes computationaly too expensive, a modified reduced state sequence estimator is disclosed to reduce the computational load. The metrics for each dimension of the multi-dimensional trellis code are precomputed separately. The appropriate one-dimensional branch metrics are then selected based on the corresponding survivor symbols in the corresponding survivor path cell for that dimension. A multi-dimensional branch metrics unit then combines the selected one-dimensional branch metrics to form the multi-dimensional branch metrics. According to another aspect of the invention, prefiltering techniques are used to reduce the computational complexity by shortening the channel memory. An example is provided of a specific implementation for a 1000 Base-T Gigabit Ethernet implementation that truncates the postcursor channel memory length to one.

A novel memory-partitioned survivor memory architecture for the survivor memory units in the survivor path cell is also disclosed. In order to prevent latency for the storage of the survivor symbols, which are required in the decision feedback unit or the multiplexer unit with zero latency, a hybrid survivor memory arrangement is disclosed for reduced state sequence estimation. In a reduced state sequence estimator implementation for a channel memory of length L, the survivor symbols corresponding to the L past decoding cycles are utilized (i) for intersymbol interference cancellation in the decision-feedback units of a conventional reduced state sequence estimator, and (ii) for the selection of branch metrics in the multiplexers in an reduced state sequence estimator according to the present invention. The present invention stores the survivors corresponding to the L past decoding cycles in a register exchange architecture (REA), and survivors corresponding to later decoding cycles are stored in a trace-back architecture (TBA) or register exchange architecture. Before symbols are moved from the register exchange architecture to the trace-back architecture, they are mapped to information bits to reduce the word size. In a 1000 Base-T implementation, the register exchange architecture is used for the entire survivor memory, as the latency introduced by the trace-back architecture in the second memory partition would lead to a violation of the tight latency budget specified for the receiver in the 1000 Base-T standard.

DETAILED DESCRIPTION

As previously indicated, the processing speed for reduced complexity sequence estimation techniques, such as reduced state sequence estimation, is limited by a recursive feedback loop. According to one feature of the present invention, the processing speed for such reduced state sequence estimation techniques is improved by precomputing the branch metrics in a look-ahead fashion. The precomputation of the branch metrics shortens the critical path, such that the delay is of the same order as in a traditional Viterbi decoder. According to another feature of the present invention, the computational load of the precomputations is significantly reduced for multi-dimensional trellis codes. Prefiltering can reduce the computational complexity by shortening the channel memory. The reduced state sequence estimation techniques of the present invention allow the implementation of reduced state sequence estimation for high-speed communications systems, such as the Gigabit Ethernet 1000 Base-T standard.

Trellis-Coded Modulation

Figure 1:
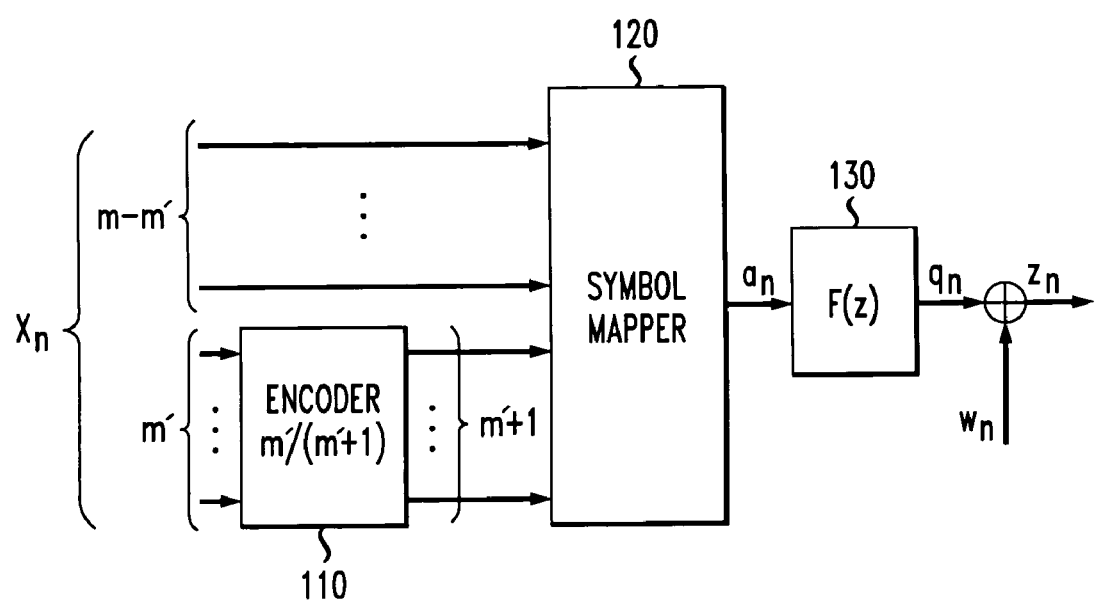
FIG. 1 illustrates an equivalent discrete time model of a conventional trellis coded communications system.

As previously indicated, reduced state sequence estimation techniques reduce the computational complexity of the Viterbi algorithm, when the reduced state sequence estimation techniques are used to equalize uncoded signals or jointly decode and equalize signals, which have been coded, using trellis-coded modulation. While the present invention is illustrated herein using decoding and equalization of trellis coded signals, the present invention also applies to the equalization of uncoded signals, as would be apparent to a person of ordinary skill in the art. Trellis-coded modulation is a combined coding and modulation scheme for band-limited channels. For a more detailed discussion of trellis-coded modulation, see, for example, G. Ungerboeck, "Trellis-Coded Modulation With Redundant Signal Sets," IEEE Comm., Vol. 25, No. 2, 5–21 (February 1987), incorporated by reference herein. FIG. 1 illustrates the equivalent discrete time model of a trellis coded communications system.

As shown in FIG. 1, information symbols $x_n$ consisting of m bits are fed into a trellis-coded modulation encoder 110. The rate $m'/(m'+1)$ encoder 110 operates on m' input bits and produces m'+1 encoded bits, which are used to select one of the $2^{m'+1}$ subsets (each of size $2^{m-m'}$) from the employed signal constellation of size $2^{m+1}$, while the uncoded bits are used to select one symbol $\alpha_n$ within the chosen subset. In the illustrative implementation, Z-level pulse amplitude modulation (Z-PAM) is used as the modulation scheme for the symbols $\alpha_n$. The techniques of the present invention, however, can be applied to other modulation schemes such as PSK or QAM, as would be apparent to a person of ordinary skill in the art. The selected symbol $\alpha_n$ is sent over the equivalent discrete-time channel. Assuming a one-dimensional channel, the channel output $z_n$ at time instant n is given by:

$$z_n = q_n + w_n = \sum_{i=0}^{L} f_i \cdot a_{n-i} + w_n, \tag{1}$$

where $q_n$ is the signal corrupted by intersymbol interference, $\{f_i\}$, $i \in [0, \ldots, L]$ are the coefficients of the equivalent discrete-time channel impulse response ($f_0 = 1$ is assumed without loss of generality), L is the length of the channel memory, and $\{w_n\}$ represents white Gaussian noise with zero mean and variance $\sigma^2$.

The concatenation of the trellis coder and channel defines a combined code and channel state, which is given by $$\xi_n = (\mu_n; \alpha_{n-L}, \ldots \alpha_{n-1}) \tag{2}$$

where $\mu_n$ is the code state and $\alpha_n = (\alpha_{n-L}, \ldots, \alpha_{n-1})$ is the channel state at time n. The optimum decoder for the received signal is the maximum likelihood sequence estimator that applies the Viterbi algorithm to the super trellis defined by the combined code and channel state. The computation and storage requirements of the Viterbi algorithm are proportional to the number of states. The number of states of the super trellis is given by:

$$T = S \times 2^{mL}, \tag{3}$$

where s is the number of code states.

The Viterbi algorithm searches for the most likely data sequence by efficiently accumulating the path metrics for all states. The branch metric for a transition from state $\xi_n$ under input $\alpha_n$ is given by:

$$\lambda(z_n, a_n, \xi_n) = \left(z_n - a_n - \sum_{i=1}^{L} f_i a_{n-i}\right)^2. \tag{4}$$

Among all paths entering state $\xi_{n+1}$ from predecessor states $\{\xi_n\}$, the most likely path is chosen according to the following path metric calculation, which is commonly referred to as add-compare-select (ACS) calculation:

$$\Gamma(\xi_{n+1}) = \min_{\{\xi_n\} \mapsto \xi_{n+1}} (\Gamma(\xi_n) + \lambda(z_n, a_n, \xi_n)). \tag{5}$$

Figure 2:
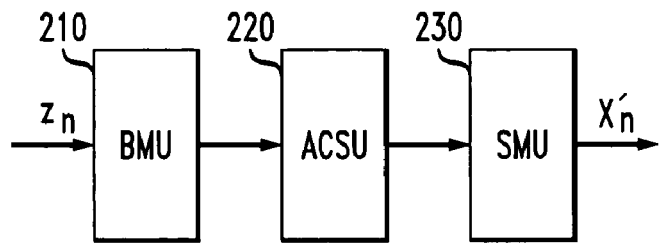
FIG. 2 illustrates a conventional implementation of the Viterbi algorithm.

An implementation of the Viterbi algorithm is shown in FIG. 2. The Viterbi implementation 200 shown in FIG. 2 comprises of a main components branch metric unit 210, an add-compare-select unit 220 and a survivor memory unit (SMU) 230. The branch metric unit 210 calculates the metrics for the state transitions according to equation (4). The add-compare-select unit (ACSU) 220 evaluates equation (5) for each state, and the survivor memory unit 230 keeps track of the surviving paths. The data flow in the branch metric unit 210 and survivor memory unit 230 is strictly feed-forward and can be pipelined at any level to increase throughput. The bottleneck for high-speed processing is the add-compare-select unit 220, as the recursion in the add-compare-select operation in equation (5) demands that a decision is made before the next step of the trellis is decoded.

Reduced state sequence estimation techniques reduce the complexity of the maximum likelihood sequence estimator by truncating the channel memory such that only the first K of the L channel coefficients $\{f_i\}$, $i \in [1, \ldots L]$, are taken into account for the trellis. See, A. Duel-Hallen and C. Heegard, "Delayed decision-feedback sequence estimation," IEEE Trans. Commun., vol. 37, pp. 428–436, May 1989, incorporated by reference herein. In addition, the set partitioning principles described in P. R. Chevillat and E. Eleftheriou, "Decoding of Trellis-Encoded Signals in the Presence of Intersymbol Interference and Noise," IEEE Trans. Comm., Vol. 37, 669–676 (July 1989) and M. V. Eyuboglu and S. U. Qureshi, "Reduced-State Sequence Estimation for Coded Modulation on Intersymbol Interference Channels," IEEE JSAC, Vol. 7, 989–995 (August 1989), each incorporated by reference herein, are applied to the signal alphabet. The reduced combined channel and code state is given in reduced state sequence estimation by $$\rho_n = (\mu_n; J_{n-K}, \ldots, J_{n-1}), \tag{6}$$

where $J_{n-i}$ is the subset the data symbol $\alpha_{n-i}$ belongs to. The number of different subsets $J_{n-1}$. It is given by $2^{m_i}$, where $m_i$ defines the depth of subset partitioning at time instant n–i. It is required that $$m' \leq m_k \leq m_{K-1} \leq \ldots \leq m_1 \leq m. \tag{7}$$

The number of states in the reduced super trellis is given as follows:

$$R = S \times 2^{m_K + \ldots + m_1}. \tag{8}$$

In reduced state sequence estimation, the branch metric for reduced state $\rho_n$ under input $\alpha_n$ takes the modified form:

$$\lambda_n(z_n, \alpha_n, \rho_n) = (z_n - \alpha_n + u_n(\rho_n))^2 \tag{9}$$

where:

$$u_n(\rho_n) = -\sum_{i=1}^{L} f_i \hat{a}_{n-i}(\rho_n) \tag{10}$$

$\alpha_n(\rho_n) = (\alpha_{n-L}(\rho_n), \ldots \alpha_{n-1}(\rho_n))$ is the survivor sequence leading to the reduced state $\rho_n$ and $\alpha_{n-i}(\rho_n)$ is the associated survivor symbol at time instant n–i. In equation (10), an intersymbol interference estimate $u(\rho_n)$ is calculated for state $\rho_n$ by taking the data symbols associated with the path history of state $\rho_n$ as tentative decisions. The best path metric for state $\rho_{n+1}$ is obtained by evaluating $$\Gamma(\rho_{n+1}) = \min_{\{\rho_n\} \mapsto \rho_{n+1}} (\Gamma(\rho_n) + \lambda(z_n, a_n, \rho_n)). \tag{11}$$

Reduced state sequence estimation can be viewed as a sub-optimum trellis decoding algorithm where each state uses decision-feedback from its own survivor path to account for the intersymbol interference not considered in the reduced trellis.

Figure 3:
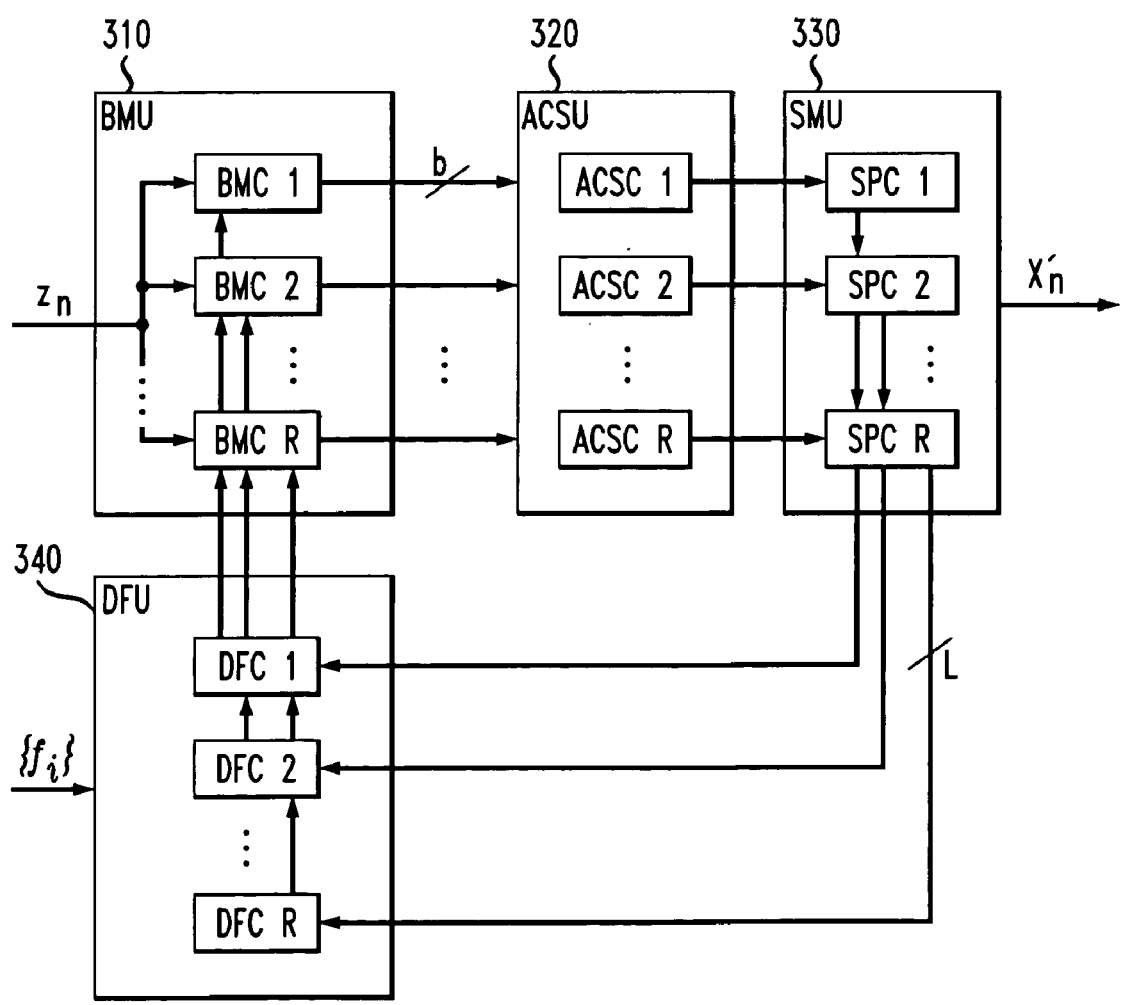
FIG. 3 illustrates the architecture for conventional implementation of an reduced state sequence estimator.

FIG. 3 illustrates the architecture for the implementation of reduced state sequence estimation. As shown in FIG. 3, the decision-feedback cells (DFC) in the decision-feedback unit 340 calculate R intersymbol interference estimates by considering the survivors in the corresponding survivor path cell (SPC) of the survivor memory unit 330 according to equation (10). Each branch metric cell (BMC) in the branch metric unit 310 computes the metrics for the $b = 2^m$ transitions leaving one state. For each state, the best path selection is performed in the add-compare-select cell (ACSC) according to equation (11). In contrast to Viterbi decoding, the decision-feedback cell, branch metric cell, and survivor path cells are in the critical loop in addition to the add-compare-select cell. The techniques for parallel processing of the Viterbi algorithm exploit the fact that the branch metric computation in equation (4) does not depend on the decision of the add-compare-select function in equation (5). Thus, branch metrics can be calculated for k trellis steps in a look-ahead fashion to obtain a k-fold increase of the throughput. Sees G. Fettweis and H. Meyr, "High-Speed Viterbi Processor: A Systolic Array Solution," IEEE JSAC, Vol. 8, 1520–1534 (October 1990) or U.S. Pat. No. 5,042,036, incorporated by reference herein. However, for reduced state sequence estimation techniques, the branch metric computation in equation (9) depends on the decision of the add-compare-select cell in the add-compare-select unit 320, which evaluates equation (11), in the previous symbol period, as the surviving symbols in the survivor path cell of the survivor memory unit 330 are needed for the decision-feedback computations in equation (10). Thus, the block processing techniques described in G. Fettweis and H. Meyr, referenced above, cannot be applied to speed up the processing of reduced state sequence estimation.

Precomputation Of Branch Metrics

The critical path in reduced state sequence estimation involves more operations than in the Viterbi algorithm. In particular, the branch metric computations in the branch metric cell can be very expensive in terms of processing time, as euclidean distances have to be obtained by either squaring or performing a table-lookup to achieve good coding gain performance. Also, the evaluation of equation (10) in the decision-feedback cell 340-$n$ may have a significant contribution to the critical path. Precomputing all branch metrics for all possible symbol combinations in the channel memory in accordance with the present invention makes it possible to remove the branch metric unit 310 and decision-feedback unit 340 from the feedback loop. This potentially allows for a significant reduction of the critical path in reduced state sequence estimation.

In principle, the channel state $\alpha_n = (\alpha_{n-L}, \ldots, \alpha_{n-1})$ can take $U = (2^{m+1})^L$ different values. The intersymbol interference estimates for a particular channel assignment $\alpha = (\alpha_{n-L}, \ldots, \alpha_{n-1})$ can be obtained by evaluating the following equation:

$$\tilde{u}(\tilde{\alpha}) = -\sum_{i=1}^{L} f_i \tilde{a}_{n-i}. \quad (12)$$

It is noted that equation (12) does not depend on the time $n$ and is thus a constant for a particular channel assignment $\alpha$. The speculative branch metric for a transition from channel assignment $\alpha$ under input $\alpha_n$ is then given by $$\lambda_n(z_n, \alpha_n, \alpha) = (z_n - \alpha_n + \tilde{u}(\alpha))^2. \quad (13)$$

The trellis coder 100 in FIG. 1 defines $2b = 2^{\tilde{m}+1}$ different subsets. Assuming that in the case of parallel transitions the best representative in a subset is obtained by slicing, a maximum of $M = 2b \times U = 2^{\tilde{m}+1} \times 2^{(m+1)L}$ different branch metrics $\lambda_n(z_n, \alpha_n, \alpha)$ are possible and have to be precomputed. The trellis coder shown in FIG. 1 may not allow all symbol combinations in the channel memory $\alpha_n$. Therefore, the number of branch metrics which have to be precomputed might be less than M. The actual number of branch metrics which have to be precomputed should be determined from the reduced super trellis.

For the add-compare-select cell 320-$n$, the appropriate branch metrics $\lambda_n(z_n, \alpha_n, \rho_n)$ among all precomputed branch metrics $\lambda_n(z_n, \alpha_n, \alpha)$ are selected by using the survivor path $\alpha n(\rho_n)$:

$$\lambda_n(z_n, \alpha_n, \rho_n) = \text{sel}\{\Lambda_n(z_n, \alpha_n, \rho_n), \alpha_n(\rho_n)\}. \quad (14)$$

In equation (14), $\Lambda_n(z_n, \alpha_n, \rho_n)$ is a vector containing the $2^{mL}$ branch metrics $\lambda_n(z_n, \alpha_n, \alpha)$, which can occur for a transition from state $\rho_n$ under input $\alpha_n$ for different channel assignments $\alpha$. The selector function in equation (14) can be implemented with a $2^{mL}$ to 1 multiplexer.

It is noted that equations (12) and (13) are both independent from the decision in the recursive add-compare-select function in equation (11). Thus, the precomputations in equations (12) and (13) are strictly feed-forward and can be pipelined at any level. Only the selection function in equation (14) lies in the critical path in addition to the add-compare-select cell and survivor path cell.

Figure 4:
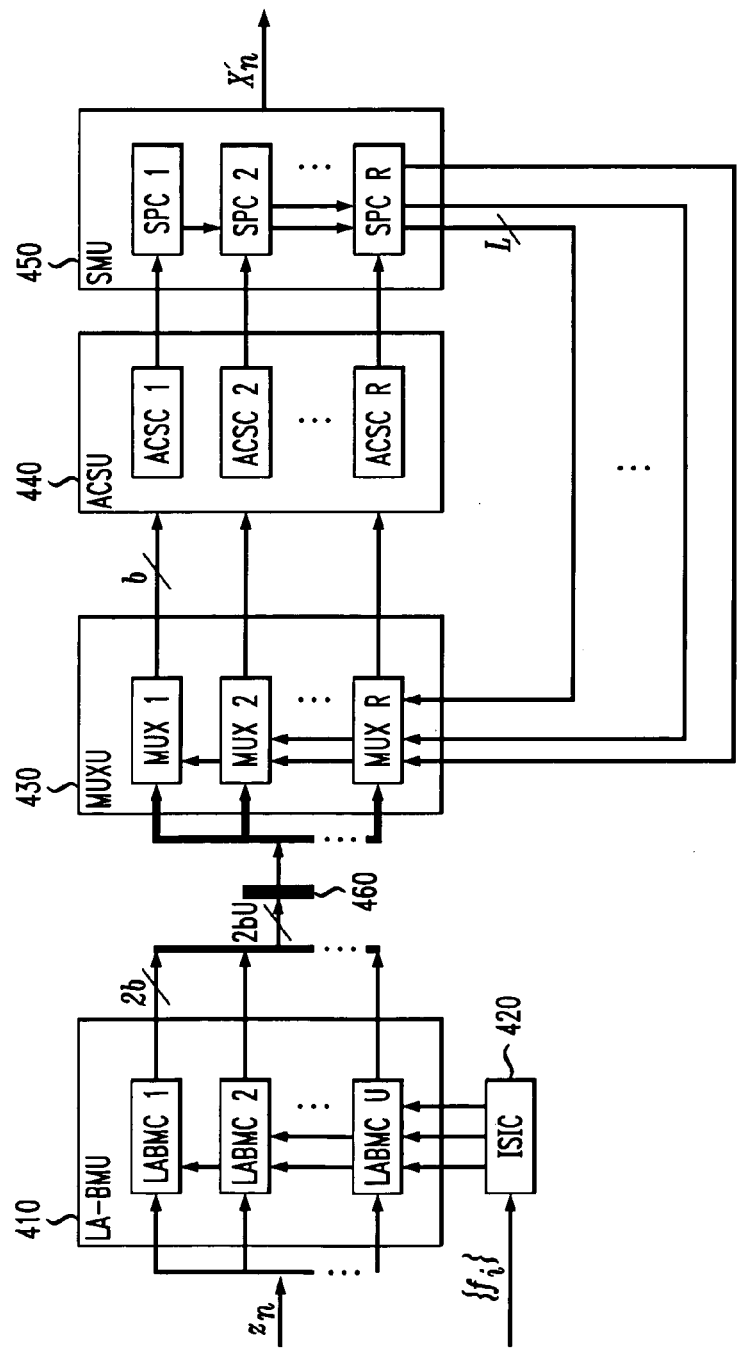
FIG. 4 illustrates the architecture of a reduced state sequence estimator with precomputation of branch metrics in accordance with the present invention.

The architecture of a reduced state sequence estimation 400 with precomputation of branch metrics in accordance with the present invention is shown in FIG. 4. The intersymbol interference canceller (ISIC) 420 calculates all U values which can occur for $\tilde{u}(\alpha)$. Each of these U values is used by a corresponding look-ahead branch metric cell 410-$n$ to calculate 2b speculative branch metrics $\lambda_n(z_n, \alpha_n, \alpha)$. All the $M = 2bU$ branch metrics precomputed in the look-ahead branch metrics unit 410 are then sent to the multiplexer unit (MUXU) 430. Then, at the beginning of each decoding cycle, each multiplexer 430-$n$ in the multiplexer unit 430 selects the appropriate branch metrics based on the survivor symbols in the corresponding survivor path cell 450-$n$, which are then sent to the add-compare-select unit 440. Each multiplexer 430-$n$ in the multiplexer unit 430 takes L past symbols from the corresponding survivor path cell 450-$n$. The add-compare-select unit 440 and survivor memory unit 450 may be embodied as in the conventional reduced state sequence estimation 300 of FIG. 3. The output of the look-ahead branch metrics unit 410 is placed in a pipeline register 460. The critical path now comprises of just the multiplexer 430, add-compare-select cell 440-$n$, and survivor path cell PC 450-$n$. The multiplexer 430 selects a branch metric in accordance with equation (14) dependent on the symbols in the survivor path cell 450-$n$. Although the number of precomputed branch metrics increases exponentially with the channel memory L and the number of information bits m, this technique is feasible for small m (corresponding to small symbol constellation sizes) and short L.

Precomputation for Multidimensional Trellis Codes

Figure 5:
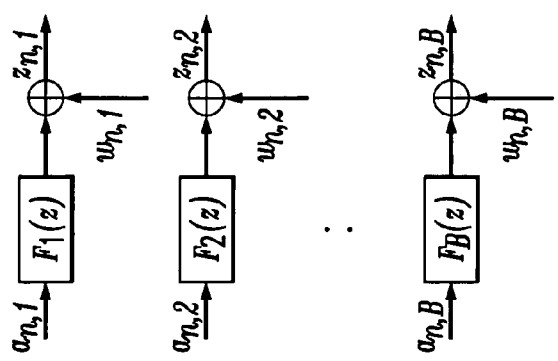
FIG. 5 illustrates the use of multi-dimensional trellis coded modulation for a multidimensional channel.

Significant coding gains for large signal constellations can be achieved with multidimensional trellis-coded modulation. FIG. 5 illustrates the use of multi-dimensional trellis coded modulation for a multidimensional channel. The B-dimensional symbol $\underline{\alpha}_n = (\alpha_{n,1}, \ldots, \alpha_{n,B})$ where $\underline{\alpha}_n$ is a vector, is sent over the B-dimensional channel with the channel coefficients $\{f_{i,j}\}$, $i \in [0, \ldots, L]$, $j \in [1 \ldots, B]$ such that the channel output $\underline{Z}_{n,1} = (Z_{n,1}, \ldots, Z_{n,B})$, is a vector given as $$z_{n,j} = \sum_{i=0}^{L} f_{i,j} \cdot a_{n-i,j} + w_{n,j}, \quad j \in [1, \ldots, B], \quad (15)$$

where $\{w_{n,j}\}$, $j \in [1, \ldots, B]$ are B uncorrelated independent white Gaussian noise sources. Z-PAM is considered as the transmission scheme for each channel. The following results are valid for other modulation schemes as well. Such an equivalent discrete time channel can be found for example in Gigabit Ethernet 1000 Base-T over copper, where B=4, m=8, $\tilde{m}$=2, S=8, Z=5. See K. Azadet, "Gigabit Ethernet Over Unshielded Twisted Pair Cables," Int'l Symposium on VLSI Technology, Systems, and Applications, Taipei (June 1999), incorporated by reference herein.

As the complexity for the precomputation of branch metrics grows exponentially with the number of information bits m, there might be cases where the precomputation of multi-dimensional branch metrics as shown in FIG. 4 might be too computationally expensive for large signal constellation sizes. However, performing precomputations of the branch metrics only for the one-dimensional components of the code can significantly reduce the complexity.

The 1-dimensional branch metric in the dimension j is precomputed by evaluating the following expressions:

$$\lambda_{n,j}(z_{n,j},\alpha_{n,j},\alpha_j) = (z_{n,j} - \alpha_{n,j} + \tilde{u}_j(\alpha_j))^2, \tag{16}$$

$$\tilde{u}_j(\tilde{\alpha}_j) = -\sum_{i=1}^{L} f_{i,j}\tilde{a}_{n-i,j}, \tag{17}$$

where $\alpha_j = (\alpha_{n-L,j}, \ldots \alpha_{n-1,j})$ is a particular assignment for the channel state $\alpha_j = (\alpha_{n-L, j}, \ldots \alpha_{n-1,j})$ in dimension j.

There are $V=Z^L$ possible 1-dimensional channel assignments $\alpha_j$. For a given channel assignment $\alpha_j$, c inputs an $\alpha_{n,j}$ have to be considered to calculate all possible 1-dimensional branch metrics $\lambda_{n,j}(z_{n,j},\alpha_{n,j}, \alpha_j)$, where c, C≦Z is the number of 1-dimensional subsets. Each of these C inputs $\alpha_{n,j}$ corresponds to the point in the corresponding subset to which $(z_{n,j})$ has been sliced to after the cancellation of the intersymbol interference according to equations (16) and (17). Consequently, considering all B dimensions, a total N=B×C×V 1-dimensional branch metrics have to be precomputed. This can be considerably less than the number of precomputations necessary for multidimensional precomputations as discussed above in the section entitled "Precomputation of Branch Metrics." In the case of the Gigabit Ethernet 1000 Base-T, with C=2 L=1, and Z=5 1-dimensional precomputation yields a total of 4×2×5=40 1-dimensional branch metric computations, whereas multi-dimensional precomputation results in $2^3 \times 2^9 = 4096$ 4-dimensional branch metric computations.

The selection of the appropriate 1-dimensional branch metrics for further processing in reduced state sequence estimation is given by:

$$\lambda_{n,j}(z_{n,j},\alpha_{n,j},\rho_n) = \text{sel}\{\Lambda_{n,j}(z_{n,j},\alpha_{n,j}),\alpha_{n,j}(\rho_n)\} \tag{18}$$

where $\Lambda_{n,j}(z_{n,j},\alpha_{n,j})$ is the vector containing all v possible 1-dimensional branch metrics $\lambda_{n,j}(z_{n,j},\alpha_{n,j}, \alpha_j)$ under input $\alpha_{n,j}$ for different one-dimensional channel assignments $\alpha_j$ and $\alpha_{n,j}(\rho_n)$ is the survivor sequence in dimension j leading to state $\rho_n$. This can be implemented using a v to 1 multiplexer compared to the $2^{mL}$ to 1 multiplexer needed for multi-dimensional precomputation (e.g., in the 1000 Base-T example above, 5 to 1 multiplexers are required c.f. to 256 to 1 MUXs). After the appropriate 1D branch metrics have been selected, the multidimensional branch metric is given as $$\lambda_n(z_n, a_n, \rho_n) = \sum_{j=1}^{B} \lambda_{n,j}(z_{n,j}, a_{n,j}, \rho_n). \tag{19}$$

Figure 6:
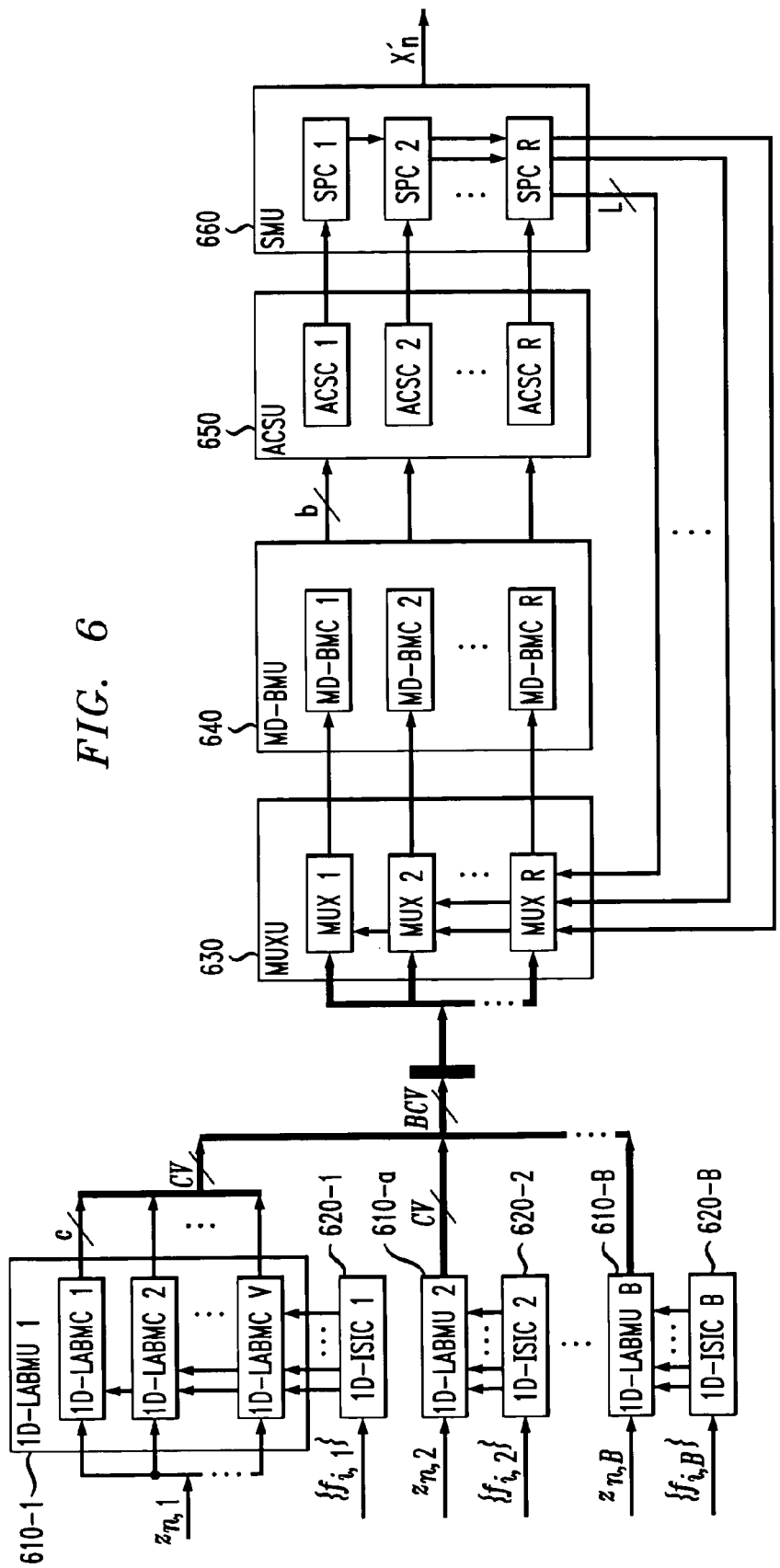
FIG. 6 illustrates the architecture for a one-dimensional precomputation for a multi-dimensional reduced state sequence estimator in accordance with the present invention.

FIG. 6 illustrates the architecture 600 for 1-dimensional precomputation for multi-dimensional reduced state sequence estimation. Each 1D-ISIC 620-n calculates the V intersymbol interference cancellation terms $\tilde{u}_j(\alpha_j)$. For each of these $\tilde{u}_j(\alpha_j)$, the corresponding 1D-LABMC 610-n precomputes C one-dimensional branch metrics per channel assignment and dimension in the 1D-LABMU 610. The multiplexer unit 630 selects for each state the appropriate one-dimensional branch metrics dependent on the survivor symbols in the SPC 660-n. Each multi-dimensional branch metric cell 640-n calculates the multi-dimensional branch metrics by using the selected 1-dimensional branch metrics. The critical path now comprises one multiplexer 630, multi-dimensional branch metric cell 640, add-compare-select cell 650 and survivor path cell 660. The multi-dimensional branch metric cell 640 performs B−1 additions and consequently has a minor contribution to the overall critical path, as the number of dimensions B is typically low.

Prefiltering

Figure 7:
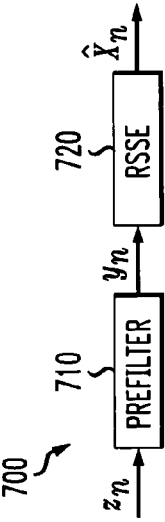
FIG. 7 illustrates the architecture of a reduced state sequence estimator that utilizes prefiltering techniques in accordance with the present invention to shorten the channel memory.

It has been shown that the complexity for the precomputation of branch metrics increases exponentially with the channel memory L. However, using the prefilter 710, shown in FIG. 7, can shorten the channel memory. As the equivalent discrete time channel after a whitened matched filter is minimum-phase, the channel memory can be truncated with a decision feedback prefilter (DFP) to low values of L without significant performance loss for reduced state sequence estimation, as described in E. F. Haratsch, "High-Speed VLSI Implementation of Reduced Complexity Sequence Estimation Algorithms With Application to Gigabit Ethernet 1000 Base-T," Int'l Symposium on VLSI Technology, Systems, and Applications, Taipei (June 1999) and U.S. patent application Ser. No. 09/326,785, filed Jun. 4, 1999 and entitled "Method and Apparatus for Reducing the Computational Complexity and Relaxing the Critical Path of Reduced State Sequence Estimation (RSSE) Techniques," each incorporated by reference herein. Alternatively, the prefilter 710 could be implemented as a linear filter, such as those described in D. D. Falconer and F. R. Magee, "Adaptive Channel Memory Truncation for Maximum-Likelihood Sequence Estimation," The Bell Systems Technical Journal, Vol. 52, No. 9, 1541–62 (November 1973), incorporated by reference herein.

Thus, for channels with large channel memories where the precomputation of branch metrics is too expensive, a prefilter could be used to truncate the channel memory such that precomputation becomes feasible.

1000-Base T Gigabit Ethernet Example

The following is an example of a specific implementation for a 1000 Base-T Gigabit Ethernet receiver. For a detailed discussion of the 1000 Base-T Gigabit Ethernet standard and related terminology and computations used herein, see, for example, M. Hatamian et al., "Design considerations for Gigabit Ethernet 1000 Base-T twisted pair transceivers," Proc. CICC, Santa Clara, Calif., pp. 335–342, May 1998, incorporated by reference herein.

Figure 8:
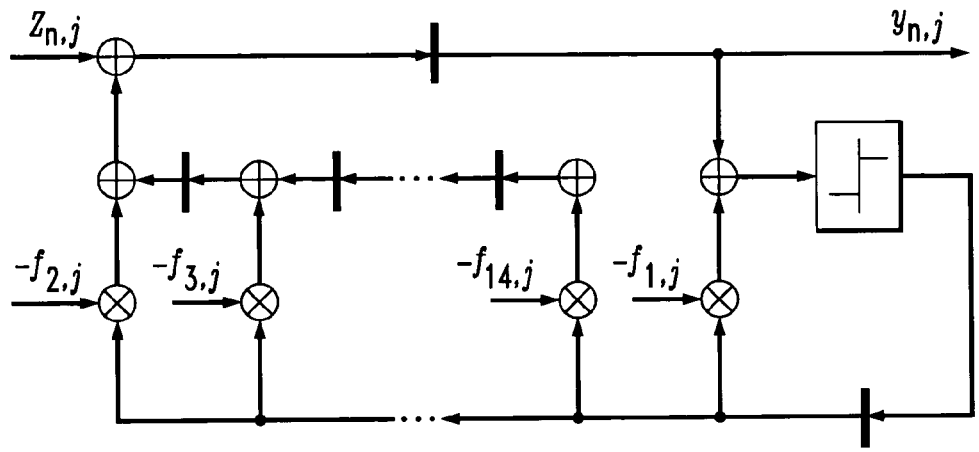
FIG. 8 illustrates a decision-feedback prefilter for a 1000 Base-T Gigabit Ethernet implementation that truncates the postcursor channel memory length from fourteen to one.
Figure 9:
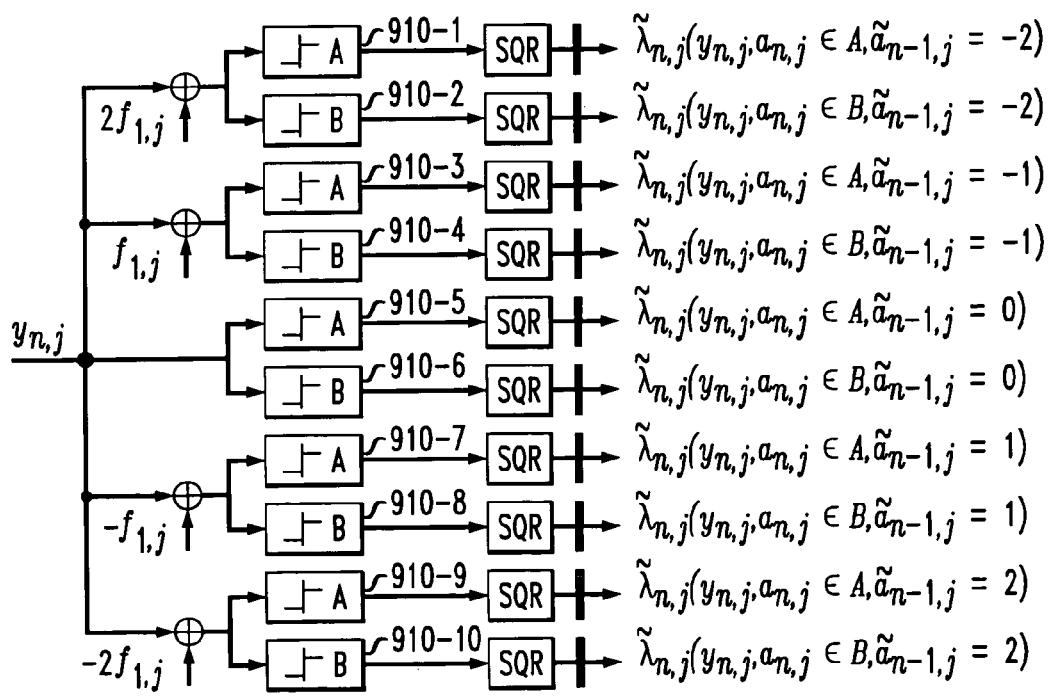
FIG. 9 illustrates the look-ahead computation of 1D branch metrics by one of the 1D-LABMU units of FIG. 6 for the 1000 Base-T Gigabit Ethernet implementation.
Figure 10:
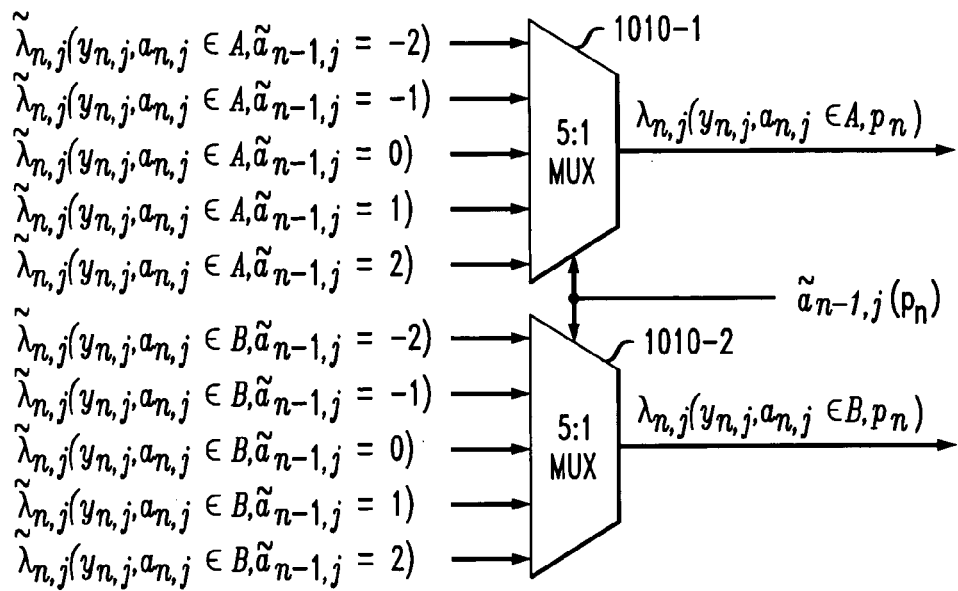
FIG. 10 illustrates the selection of the 1D branch metrics by the multiplexer of FIG. 6 for the 1000 Base-T Gigabit Ethernet implementation.
Figure 11:
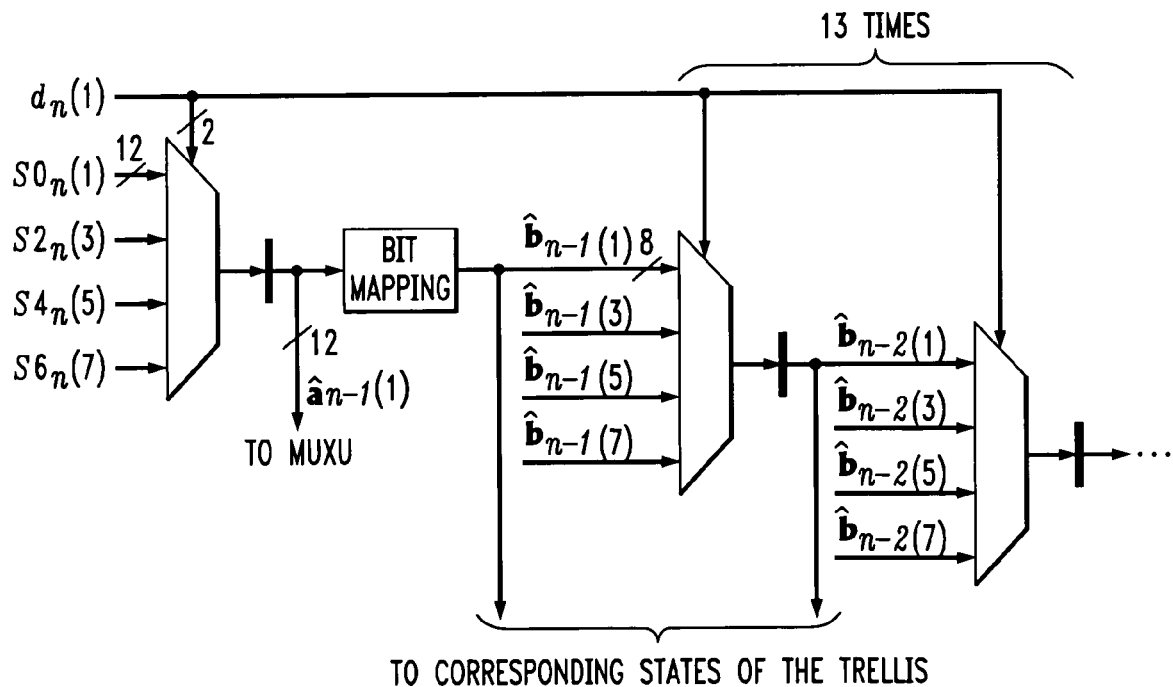
FIG. 11 illustrates a novel memory-partitioned register exchange network (SPC-n) for state one for the 1000 Base-T Gigabit Ethernet implementation.

A decision-feedback prefilter for the 1000 Base-T Gigabit Ethernet implementation is shown in FIG. 8. The look-ahead computation of 1D branch metrics by one of the 1D-LA-BMU units of FIG. 6 for the 1000 Base-T Gigabit Ethernet implementation is shown in FIG. 9. FIG. 10 illustrates the selection of the 1D branch metrics by the multiplexer of FIG. 6 for the 1000 Base-T Gigabit Ethernet implementation. Finally, FIG. 11 illustrates the register exchange network (SPC n) for state one for the 1000 Base-T Gigabit Ethernet implementation, where an illustrative merge depth of 14 is utilized for the survivor memory unit.

Decision-Feedback Prefilter

A decision-feedback prefilter 800 that truncates the postcursor memory length on wire pair j from fourteen to one is shown in FIG. 8. The decision-feedback prefilter 800 resembles the structure of a decision-feedback equalizer (DFE) as it uses tentative decisions obtained by its own slicer to remove the tail of the postcursor channel impulse response.

Precomputation of 1D branch metrics

As the effective postcursor channel memory is one after the decision-feedback prefilter 800, the computational complexity for look-ahead precomputations of 1D branch metrics on each wire pair is modest. The speculative 1D branch metric for wire pair j under the assumption that the channel memory contains $\alpha_{n-1,j}$ is $$\lambda_{n,j}(y_{n,j}, \alpha_{n,j}, \alpha_{n-1,j}) = (y_{n,j} - \alpha_{n,j} - f_{1,j}\alpha_{n-1,j})^2. \quad (20)$$

As there are 5 possible values for $\alpha_{n,j}$, and as $y_{n,j}$ after removal of intersymbol interference has to be sliced to the closest representative of both 1D subsets A as well as B, a total of 10 1D branch metrics have to be precomputed per wire pair. This is shown in FIG. 9, where the slicers 910-$n$ calculate the difference to the closest point in 1D subset A or B. There is one clock cycle time for one addition, slicing, and squaring. It should be noted that the computational complexity of precomputing branch metrics increases exponentially with the channel memory. If the channel memory were two, 50 1D branch metrics would have to be precomputed per wire pair, and for a channel memory of three this number would increase to 250.

Selection of 1D Branch Metrics

The multiplexer unit 630 selects for each wire pair j and code state $\rho_n$ the appropriate 1D branch metrics corresponding to subsets A and B based on the past survivor symbol $\alpha_{n-i,j}(\rho_n)$. This is done with 5:1 multiplexers 1010 as shown in FIG. 10. In total, 64 such multiplexers are needed.

Computation of 4D Branch Metrics

The 4D-BMU 640 adds up the 1D branch metrics to calculate the 4D branch metrics corresponding to state transitions in the trellis. The 4D-BMU 640 is in the critical loop. Bringing the 4D-BMU 640 out of the critical loop by look-ahead precomputations of 4D branch metrics would be impractical in terms of computational complexity, as shown in the example discussed above in the section entitled "Precomputation of Multi-Dimensional Trellis Codes." It can be easily seen that there are too many possibilities, which must be considered.

Add-Compare-Select

For each state, a 4-way add-compare-select has to be performed. To speed up the processing, the architecture proposed in P. J. Black and T. H. Meng, "A 140-Mb/s, 32-state, radix-4 Viterbi decoder," IEEE JSSC, vol. 27, pp. 1877–1885, December 1992, has been chosen, where the minimum path metric among the 4 candidates is selected by 6 comparisons in parallel. State metric normalization is done using modulo arithmetic, See, A. P. Hekstra, "An Alternative To Metric Rescaling In Viterbi Decoders", IEEE Trans. Commun., vol. 37, pp. 1220–1222, November 1989.

Survivor Memory

In Viterbi decoding, usually the trace-back architecture is the preferred architecture for the survivor memory as it has considerably less power consumption than the register exchange architecture. R. Cypher and C. B. Shung, "Generalized Trace-Back Techniques For Survivor Memory Management In The Viterbi Algorithm," Journal of VLSI Signal Processing, vol. 5, pp. 85–94, 1993. However, as the trace-back architecture introduces latency it cannot be used to store the survivor symbols, which are required in the decision-feedback unit or multiplexer unit with zero latency. Thus, a hybrid survivor memory arrangement seems to be favorable for a reduced state sequence estimation implementation for a channel of memory length L. The survivors corresponding to the L past decoding cycles are stored in a register exchange architecture, and survivors corresponding to later decoding cycles in a trace-back architecture. Before symbols are moved from the register exchange architecture to the trace-back architecture, they are mapped to information bits to reduce the word size. However, in 1000 Base-T the register exchange architecture must be used for the entire survivor memory, as the latency introduced by the trace-back architecture would lead to a violation of the tight latency budget specified for the receiver in the 1000 Base-T standard. Likewise, symbols moved from the first register exchange architecture to the second register exchange architecture are mapped to information bits to reduce the word size.

The survivor memory architecture is shown in FIG. 11, where only the first row corresponding to state one is shown. $SX_n(\rho_n)$ denotes the decision for 4D subset SX for a transition from state $\rho_n$ (for definition of 4D subsets see, Hatamian et al.), $\hat{b}_{n-i}(\rho_n)$ are the 8 information bits which correspond to the 4D survivor symbol $\alpha_{n-i}(\rho_n)$ and $d_n(1)$ is the 2-bit decision of the add-compare-select for state one. As the channel memory seen by the reduced state sequence estimation is one, only the first column stores 4D symbols, which are represented by 12 bits and are fed into the multiplexer unit. After this first column, the survivor symbols are mapped to information bits and then stored as 8 bits. For a merge depth of 14, this architecture needs 928 REGs compared to 1344 REGs in a survivor memory unit which does not apply the hybrid memory partition, where all decisions are stored as 12 bit 4D symbols.

It is to be understood that the embodiments and variations shown and described herein are merely illustrative of the principles of this invention and that various modifications may be implemented by those skilled in the art without departing from the scope and spirit of the invention.

We claim:

1. A method for processing a received signal, said method comprising the steps of:
   precomputing branch metrics using said received signal for speculative sequences of one or more channel symbols;
   storing said precomputed branch metrics in at least one pipeline register;
   selecting one of said precomputed branch metrics from one of said at least one pipeline register based on at least one survivor symbol from a corresponding state;
   computing a path metric using said selected precomputed branch metric; and
   selecting a path having a best path metric for a given state.

2. The method of claim 1, wherein said precomputed branch metrics is given by:

$$\lambda_n(z_n,\alpha_n,\alpha)=(z_n-\alpha_n+\tilde{u}(\alpha))^2,$$

wherein an intersymbol interference estimate is obtained by evaluating the following equation:

$$\tilde{u}(\tilde{\alpha}) = -\sum_{i=1}^{L} f_i \tilde{a}_{n-i}$$

and wherein $z_n$ is the detector input at time instant n, L is a channel memory length, $\{f_i\}$, $i \in \{0, \ldots, L\}$ are coefficients of the equivalent discrete-time channel impulse response, $\alpha_n$ is a channel symbol, and $\alpha=(\alpha_{n-L}, \ldots, \alpha_{n-1})$ is a sequence of channel symbols.

3. The method of claim 1, wherein said path metric is an accumulation of said corresponding branch metrics over time.

4. The method of claim 1, wherein an appropriate branch metrics $\lambda_n(z_n,\alpha_n,\rho_n)$ is selected from said precomputed branch metrics $\lambda_n(z_n,\alpha_n,\alpha)$ using the survivor path $\alpha_n(\rho_n)$:

$$\lambda_n(z_n,\alpha_n,\rho_n)=\text{sel}\{\Lambda_n(z_n,\alpha_n,\rho_n),\alpha_n(\rho_n)\}$$

wherein $\Lambda_n(z_n,\alpha_n,\rho_n)$ is a vector containing the branch metrics $\lambda_n(z_n,\alpha_n,\alpha)$, which can occur for a transition from state $\rho_n$ and which correspond to channel symbol $\alpha_n$, but different channel sequences $\alpha$, and wherein $\alpha_n(\rho_n)$ is the survivor sequence leading to state $\rho_n$.

5. The method of claim 1, wherein said best path metric is a minimum or maximum path metric.

6. The method of claim 1, wherein said processing of said signal is performed using a reduced state sequence estimation technique.

7. The method according to claim 1, wherein said processing of said signal is performed using a delayed decision-feedback sequence estimation technique.

8. The method according to claim 1, wherein said processing of said signal is performed using a parallel decision-feedback equalization technique.

9. The method of claim 1, wherein said processing of said signal is performed using an implementation of the Viterbi algorithm.

10. The method of claim 1, wherein said processing of said signal is performed using an implementation of the M algorithm.

11. A method for processing a received multi-dimensional signal, said method comprising the steps of:
    precomputing one-dimensional branch metrics for each dimension of the received multi-dimensional signal for speculative sequences of one or more channel symbols;
    storing said precomputed one-dimensional branch metrics in at least one pipeline register;
    selecting one of said precomputed one-dimensional branch metric from one of said at least one pipeline register based on at least one survivor symbol from a corresponding state; and
    combining said selected one-dimensional branch metrics to obtain a multi-dimensional branch metric.

12. The method of claim 11, wherein said one-dimensional branch metric in the dimension j is precomputed by evaluating the following expressions:

$$\lambda_{n,j}(z_{n,j},\alpha_{n,j},\alpha_j)=(z_{n,j}-\alpha_{n,j}+\tilde{u}_j(\alpha_j))^2 \text{ and}$$

$$\tilde{u}_j(\tilde{\alpha}_j) = -\sum_{i=1}^{L} f_{i,j} \tilde{a}_{n-i,j},$$

wherein $z_{n,j}$ is the detector input, $\alpha_{n,j}$ is channel symbol at time n and $\alpha_j=(\alpha_{n-L,j}, \ldots \alpha_{n-1,j})$ is a sequence of channel symbols in dimension j, L is a channel memory length, B is the number of dimensions, and $\{f_{i,j}\}$, $i \in \{0, \ldots\}$, $j \in \{1 \ldots, B\}$ are coefficients of the equivalent discrete-time channel impulse response.

13. The method of claim 11, wherein said selection of an appropriate one-dimensional branch metrics is given by:

$$\lambda_{n,j}(z_{n,j},\alpha_{n,j},\rho_n)=\text{sel}\{\Lambda_{n,j}(z_{n,j},\alpha_{n,j}),\alpha_{n,j}(\rho_n)\},$$

wherein $\Lambda_{n,j}(z_{n,j},\alpha_{n,j})$ is the vector containing possible one-dimensional branch metrics $\lambda_{n,j}(z_{n,j},\alpha_{n,j},\alpha_j)$ for the same channel symbol $\alpha_{n,j}$, but different channel symbol sequences $\alpha_j$ and $\alpha_{n,j}(\rho_n)$ is the survivor sequence in dimension j leading to state $\rho_n$.

14. A method for processing a received multi-dimensional signal, said method comprising the steps of:
    precomputing one-dimensional branch metrics for each dimension of the received multi-dimensional signal for speculative sequences of one or more channel symbols;
    combining said one-dimensional branch metrics into at least two-dimensional branch metrics;
    storing said combined at least two-dimensional branch metrics in at least one pipeline register; and
    selecting one of said at least two-dimensional branch metrics from one of said at least one pipeline register based on at least one survivor symbol from a corresponding state.

15. The method of claim 14, wherein said one-dimensional branch metric in the dimension j is precomputed by evaluating the following expressions:

$$\lambda_{n,j}(z_{n,j},\alpha_{n,j},\alpha_j)=(z_{n,j}-\alpha_{n,j}+\tilde{u}_j(\alpha_j))^2 \text{ and}$$

$$\tilde{u}_j(\tilde{\alpha}_j) = -\sum_{i=1}^{L} f_{i,j} \tilde{a}_{n-i,j},$$

wherein $Z_{n,j}$ is the detector input, $\alpha_{n,j}$ is channel symbol at time n and $\alpha_j=(\alpha_{n-L,j}, \ldots, \alpha_{n-1, j})$ is a sequence of channel symbols in dimension j, L is a channel memory length, B is the number of dimensions, and $\{f_{i,j}\}$, $i \in \{0, \ldots, L\}$, $j \in \{1 \ldots, B\}$ are coefficients of the equivalent discrete-time channel impulse response.

16. The method of claim 14, wherein said selection of an appropriate at least two-dimensional branch metrics corresponding to a particular state and channel symbol is based on the survivor symbols for said state and said at least two dimensions and said selection is performed among said precomputed at least two-dimensional branch metrics for said state, channel symbol and different previous channel symbol sequences.

17. The method of claim 14, further comprising the step of combining said selected at least two-dimensional branch metric to obtain a multi-dimensional branch metric.

18. A method for processing a received signal received from a channel, said method comprising the steps of:

prefiltering said received signal to shorten a memory of said channel;
precomputing branch metrics using said received signal for speculative sequences of symbols that correspond to said shortened channel memory;
storing said precomputed branch metrics in at least one pipeline register;
selecting one of said precomputed branch metrics from one of said at least one pipeline register based on at least one survivor symbol from a corresponding state;
computing a path metric using said selected precomputed branch metric; and
selecting a path having a best path metric for a given state.

19. The method of claim 18, wherein said prefiltering step further comprises the step of processing ISI associated with less significant coefficients of said channel impulse response with a lower complexity cancellation algorithm using tentative decisions and said steps of precomputing branch metrics, selecting one of said branch metrics and selecting a path implement a reduced complexity sequence estimation technique to process ISI associated with more significant coefficients of said channel impulse response.

20. The method according to claim 19, wherein said lower complexity cancellation algorithm is a decision feedback prefilter technique.

21. The method according to claim 19, wherein said lower complexity cancellation algorithm utilizes a linear equalizer technique.

22. The method according to claim 19, wherein said lower complexity cancellation algorithm reduces the intersymbol interference associated with said less significant taps.

23. The method according to claim 19, wherein said more significant coefficients comprise coefficients below a coefficient number, U, where U is a prescribed number less than L.

24. The method according to claim 19, wherein said reduced complexity sequence estimation technique is performed using a decision-feedback sequence estimation technique.

25. The method according to claim 19, wherein said reduced complexity sequence estimation technique is performed using a parallel decision-feedback equalization technique.

26. The method according to claim 19, wherein said reduced complexity sequence estimation technique is performed using a reduced state sequence estimation technique.

27. The method according to claim 19, wherein said reduced complexity sequence estimation technique is performed using an implementation of the Viterbi algorithm.

28. The method according to claim 19, wherein said reduced complexity sequence estimation technique is performed using an implementation of the M algorithm.

29. A method for processing a received signal received from a channel, said method comprising the steps of:
prefiltering said received signal to shorten a memory of said channel;
precomputing a one-dimensional branch metric using said received signal for speculative sequences of channel symbols for said shortened channel memory and for each dimension of the multi-dimensional signal;
combining said one-dimensional branch metric into at least two-dimensional branch metrics;
storing said combined at least two-dimensional branch metrics in at least one pipeline register; and
selecting one of said at least two-dimensional branch metrics from one of said at least one pipeline register based on at least one survivor symbol from a corresponding state.

30. A signal processor for processing a received signal, comprising:
a branch metrics unit for precomputing branch metrics using said received signal for speculative sequences of one or more channel symbols;
at least one pipeline register for storing said precomputed branch metrics;
a multiplexer for selecting one of said precomputed branch metrics from one of said at least one pipeline register based on at least one survivor symbol from a corresponding state; and
an add-compare-select unit for computing a path metric using said selected precomputed branch metric and for selecting a path having a best path metric for a given state.

31. A signal processor for processing a received multi-dimensional signal:
a branch metrics unit for precomputing one-dimensional branch metrics for each dimension of the received multi-dimensional trellis code for speculative sequences of one or more channel symbols;
at least one pipeline register for storing said precomputed one-dimensional branch metrics;
a multiplexer for selecting one of said precomputed one-dimensional branch metric from one of said at least one pipeline register based on at least one survivor symbol from a corresponding state; and
a multi-dimensional branch metric computation unit for computing a multi-dimensional branch metric based on said selected one-dimensional branch metrics.

32. A signal processor for processing a received multi-dimensional signal, comprising:
a branch metrics unit for precomputing one-dimensional branch metrics for each dimension of the received multi-dimensional signal for speculative sequences of one or more channel symbols;
means for combining said one-dimensional branch metric into at least two-dimensional branch metrics;
at least one pipeline register for storing said combined at least two-dimensional branch metrics;
a multiplexer for selecting one of said at least two-dimensional branch metrics from one of said at least one pipeline register based on at least one survivor symbol from a corresponding state; and
a multi-dimensional branch metric unit for combining said selected at least two-dimensional branch metric to obtain a multi-dimensional branch metric.

33. The signal processor of claim 32, wherein said survivor symbol from a corresponding state is based on a survivor symbol in a corresponding survivor path cell.

34. A signal processor for processing a signal received from a channel, comprising:
a prefilter to shorten a memory of said channel;
a branch metrics unit for precomputing branch metrics using said received signal for speculative sequences of one or more channel symbols for said shortened channel memory;
at least one pipeline register for storing said precomputed branch metrics;
a multiplexer for selecting one of said precomputed branch metrics from one of said at least one pipeline register based on at least one survivor symbol from a corresponding state; and an add-compare-select unit for computing a path metric using said selected precomputed branch metric and for selecting a path having a best path metric for a given state.

35. A signal processor for processing a received multi-dimensional signal received from channel, comprising:

a prefilter to shorten a memory of said channel;

a branch metrics unit for precomputing one-dimensional branch metrics for speculative sequences of one or more channel symbols for said shortened channel memory and for each dimension of the multi-dimensional signal;

means for combining said one-dimensional branch metric into at least two-dimensional branch metrics;

at least one pipeline register for storing said combined at least two-dimensional branch metrics; and a multiplexer for selecting one of said at least two-dimensional branch metrics from one of said at least one pipeline register based on at least one survivor symbol from a corresponding state.

\* \* \* \* \*

UNITED STATES PATENT AND TRADEMARK OFFICE
CERTIFICATE OF CORRECTION

PATENT NO. : 6,999,521 B1
APPLICATION NO. : 09/471920
DATED : February 14, 2006
INVENTOR(S) : Azadet et al.

It is certified that error appears in the above-identified patent and that said Letters Patent is hereby corrected as shown below:

Column 6, line 30, replace "$\alpha_n(\rho_n) = (\alpha_{n-L}(\rho_n),..,\alpha_{n-1}(\rho_n))$" with
-- $\hat{\alpha}_n(\rho_n) = (\hat{a}_{n-L}(\rho_n),..,\hat{a}_{n-1}(\rho_n))$ --.

Column 7, line 36, replace "$\alpha = (\alpha_{n-L},..,\alpha_{n-1})$" with -- $\tilde{\alpha} = (\tilde{a}_{n-L},..,\tilde{a}_{n-1})$ --.

Column 7, line 50, replace "$\lambda_n(z_n,\alpha_n,\alpha) = (z_n - \alpha_n + \tilde{u}(\alpha))^2$" with
-- $\tilde{\lambda}_n(z_n,a_n,\tilde{\alpha}) = (z_n - a_n + \tilde{u}(\tilde{\alpha}))^2$ --.

Column 7, line 55, replace "$\lambda_n(z_n,\alpha_n,\alpha)$" with -- $\tilde{\lambda}_n(z_n,a_n,\tilde{\alpha})$ --.

Column 7, line 64, replace "$\lambda_n(z_n,\alpha_n,\alpha)$" with -- $\tilde{\lambda}_n(z_n,a_n,\tilde{\alpha})$ --.

Column 7, line 65, replace "$\alpha_n(\rho_n)$" with -- $\hat{\alpha}_n(\rho_n)$ --.

Column 7, line 67, replace "$\lambda_n(z_n,\alpha_n,\rho_n) = sel\{\Lambda_n(z_n,a_n,\rho_n),\alpha_n(\rho_n)\}$"
with -- $\lambda_n(z_n,a_n,\rho_n) = sel\{\Lambda_n(z_n,a_n,\rho_n),\hat{\alpha}_n(\rho_n)\}$ --.

Column 8, line 2, replace "$\lambda_n(z_n,\alpha_n,\alpha)$" with -- $\tilde{\lambda}_n(z_n,a_n,\tilde{\alpha})$ --.

Column 8, line 17, replace "$\tilde{u}(\alpha)$" with -- $\tilde{u}(\tilde{\alpha})$ --.

Column 8, line 20, replace "$\lambda_n(z_n,\alpha_n,\alpha)$" with -- $\tilde{\lambda}_n(z_n,a_n,\tilde{\alpha})$ --.

Column 9, line 19, replace "$\lambda_{n,j}(z_{n,j},a_{n,j},\alpha_j) = (z_{n,j} - a_{n,j} + \tilde{u}_j(\alpha_j))^2$"
with -- $\tilde{\lambda}_{n,j}(z_{n,j},a_{n,j},\tilde{\alpha}_j) = (z_{n,j} - a_{n,j} + \tilde{u}_j(\tilde{\alpha}_j))^2$ --. --.

Column 9, line 28, replace "$\alpha_j = (\alpha_{n-L,j},..,\alpha_{n-1,j})$" with -- $\tilde{\alpha}_j = (\tilde{a}_{n-L,j},..,\tilde{a}_{n-1,j})$ --.

UNITED STATES PATENT AND TRADEMARK OFFICE
CERTIFICATE OF CORRECTION

PATENT NO. : 6,999,521 B1
APPLICATION NO. : 09/471920
DATED : February 14, 2006
INVENTOR(S) : Azadet et al.

It is certified that error appears in the above-identified patent and that said Letters Patent is hereby corrected as shown below:

Column 9, line 31, replace "$\alpha_j$" with -- $\tilde{\alpha}_j$ --.

Column 9, line 33, replace "$\lambda_{n,j}(z_{n,j},\alpha_{n,j},\alpha_j)$" with -- $\tilde{\lambda}_{n,j}(z_{n,j},a_{n,j},\tilde{\alpha}_j)$ --.

Column 9, line 54, replace "$\lambda_{n,j}(z_{n,j},\alpha_{n,j},\rho_n) = sel\{\Lambda_{n,j}(z_{n,j},a_{n,j}),\alpha_{n,j}(\rho_n)\}$" with -- $\lambda_{n,j}(z_{n,j},a_{n,j},\rho_n) = sel\{\Lambda_{n,j}(z_{n,j},a_{n,j}),\hat{a}_{n,j}(\rho_n)\}$ --.

Column 9, line 57, replace "$\lambda_{n,j}(z_{n,j},\alpha_{n,j},\alpha_j)$" with -- $\tilde{\lambda}_{n,j}(z_{n,j},a_{n,j},\tilde{\alpha}_j)$ --.

Column 9, line 58, replace "$\alpha_j$" with -- $\tilde{\alpha}_j$ --.

Column 9, line 59, replace "$\alpha_{n,j}(\rho_n)$" with -- $\hat{a}_{n,j}(\rho_n)$ --.

Column 11, line 25, replace "$\alpha_{n-1,j}$" with -- $\tilde{a}_{n-1,j}$ --.

Column 11, line 27, replace "$\lambda_{n,j}(y_{n,j},\alpha_{n,j},\alpha_{n-1,j}) = (y_{n,j} - \alpha_{n,j} - f_{1,j}\alpha_{n-1,j})^2$" with -- $\tilde{\lambda}_{n,j}(y_{n,j},a_{n,j},\tilde{a}_{n-1,j}) = (y_{n,j} - a_{n,j} - f_{1,j}\tilde{a}_{n-1,j})^2$ --.

Column 11, line 46, replace "$\alpha_{n-i,j}(\rho_n)$" with -- $\hat{a}_{n-i,j}(\rho_n)$ --.

Column 13, line 4, replace "$\lambda_n(z_n,\alpha_n,\alpha) = (z_n - a_n + \tilde{u}(\alpha))^2$" with -- $\tilde{\lambda}_n(z_n,a_n,\tilde{\alpha}) = (z_n - a_n + \tilde{u}(\tilde{\alpha}))^2$ --

Column 13, line 16, replace "$\alpha = (\alpha_{n-L},...,\alpha_{n-1})$" with -- $\tilde{\alpha} = (\tilde{a}_{n-L},...,\tilde{a}_{n-1})$ --.

Column 13, line 25, replace "$\lambda_n(z_n,\alpha_n,\alpha)$ using the survivor path $\alpha_n(\rho_n)$" with -- $\tilde{\lambda}_n(z_n,a_n,\tilde{\alpha})$ using the survivor path $\hat{\alpha}_n(\rho_n)$ --.

UNITED STATES PATENT AND TRADEMARK OFFICE
CERTIFICATE OF CORRECTION

PATENT NO. : 6,999,521 B1
APPLICATION NO. : 09/471920
DATED : February 14, 2006
INVENTOR(S) : Azadet et al.

It is certified that error appears in the above-identified patent and that said Letters Patent is hereby corrected as shown below:

Column 13, line 27, replace "$\lambda_n(z_n,\alpha_n,\rho_n) = sel\{\Lambda_n(z_n,a_n,\rho_n),\alpha_n(\rho_n)\}$" with
-- $\tilde{\lambda}_n(z_n,a_n,\rho_n) = sel\{\Lambda_n(z_n,a_n,\rho_n),\hat{\alpha}_n(\rho_n)\}$ --.

Column 13, line 30, replace "$\lambda_n(z_n,\alpha_n,\alpha)$" with -- $\tilde{\lambda}_n(z_n,a_n,\tilde{\alpha})$ --.

Column 13, line 32 "$\alpha$ and wherein $\alpha_n(\rho_n)$" with -- $\tilde{\alpha}$ and wherein $\hat{\alpha}_n(\rho_n)$ --.

Column 13, line 60, before "from one" and after "branch" replace "metric" with -- metrics --.

Column 14, line 1, replace "$\lambda_{n,j}(z_{n,j},\alpha_{n,j},\alpha_j) = (z_{n,j} - a_{n,j} + \tilde{u}_j(\alpha_j))^2$" with
-- $\tilde{\lambda}_{n,j}(z_{n,j},a_{n,j},\tilde{\alpha}_j) = (z_{n,j} - a_{n,j} + \tilde{u}_j(\tilde{\alpha}_j))^2$ --.

Column 14, line 10, replace "$\alpha_j = (\alpha_{n-L,j},...,\alpha_{n-1,j})$" with -- $\tilde{\alpha}_j = (\tilde{a}_{n-L,j},...,\tilde{a}_{n-1,j})$ --.

Column 14, line 18, replace "$\lambda_{n,j}(z_{n,j},\alpha_{n,j},\rho_n) = sel\{\Lambda_{n,j}(z_{n,j},a_{n,j}),\alpha_{n,j}(\rho_n)\}$" with
-- $\lambda_{n,j}(z_{n,j},a_{n,j},\rho_n) = sel\{\Lambda_{n,j}(z_{n,j},a_{n,j}),\hat{\alpha}_{n,j}(\rho_n)\}$ --.

Column 14, line 20, replace "$\lambda_{n,j}(z_{n,j},\alpha_{n,j},\alpha_j)$" with -- $\tilde{\lambda}_{n,j}(z_{n,j},a_{n,j},\tilde{\alpha}_j)$ --.

Column 14, line 22, replace "$\alpha_j$ and $\alpha_{n,j}(\rho_n)$" with -- $\tilde{\alpha}_j$ and $\hat{\alpha}_{n,j}(\rho_n)$ --.

Column 14, line 42, replace "$\lambda_{n,j}(z_{n,j},\alpha_{n,j},\alpha_j) = (z_{n,j} - a_{n,j} + \tilde{u}_j(\alpha_j))^2$" with
-- $\tilde{\lambda}_{n,j}(z_{n,j},a_{n,j},\tilde{\alpha}_j) = (z_{n,j} - a_{n,j} + \tilde{u}_j(\tilde{\alpha}_j))^2$ --.

UNITED STATES PATENT AND TRADEMARK OFFICE
CERTIFICATE OF CORRECTION

PATENT NO. : 6,999,521 B1
APPLICATION NO. : 09/471920
DATED : February 14, 2006
INVENTOR(S) : Azadet et al.

It is certified that error appears in the above-identified patent and that said Letters Patent is hereby corrected as shown below:

Column 14, line 50, replace "$\alpha_j = (\alpha_{n-L,j},...,\alpha_{n-1,j})$" with -- $\tilde{\alpha}_j = (\tilde{a}_{n-L,j},...,\tilde{a}_{n-1,j})$ --.

Signed and Sealed this

Twenty-eighth Day of November, 2006

JON W. DUDAS
*Director of the United States Patent and Trademark Office*